United States Patent
Nakagawa et al.

(10) Patent No.: US 11,513,429 B2
(45) Date of Patent: Nov. 29, 2022

(54) CAMERA ACCESSORY AND CAMERA

(71) Applicant: CANON KABUSHIKI KAISHA, Tokyo (JP)

(72) Inventors: Yusuke Nakagawa, Tokyo (JP); Yutaka Kojima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/170,132

(22) Filed: Feb. 8, 2021

(65) Prior Publication Data
US 2021/0165307 A1  Jun. 3, 2021

Related U.S. Application Data

(63) Continuation of application No. PCT/JP2019/027156, filed on Jul. 9, 2019.

(30) Foreign Application Priority Data

Aug. 9, 2018  (JP) .............................. JP2018-150913

(51) Int. Cl.
*G03B 17/56* (2021.01)
*G03B 17/02* (2021.01)
*H04N 5/225* (2006.01)

(52) U.S. Cl.
CPC ........... *G03B 17/563* (2013.01); *G03B 17/02* (2013.01); *G03B 17/566* (2013.01); *H04N 5/2252* (2013.01)

(58) Field of Classification Search
CPC ..................................................... G03B 17/563
See application file for complete search history.

(56) References Cited

U.S. PATENT DOCUMENTS

| 11,073,748 | B2 * | 7/2021 | Yano ..................... G03B 17/563 |
| 2005/0281554 | A1 | 12/2005 | Iwasa | |
| 2007/0205208 | A1 * | 9/2007 | Ueda ..................... H04N 5/2252 |
| | | | 220/813 |

FOREIGN PATENT DOCUMENTS

| CN | 101026231 A | 8/2007 |
| CN | 204044483 U | 12/2014 |
| CN | 207539555 U | 6/2018 |
| JP | 59-107336 A | 6/1984 |
| JP | S59-107336 A | 6/1984 |
| JP | 2001-075157 A | 3/2001 |

(Continued)

OTHER PUBLICATIONS

Archive.org copy of SmallRig Co-Design listings at http://www.smallrig.com/co-designs/ dated Jun. 9, 2018 (Year: 2018).*

(Continued)

*Primary Examiner* — Leon W Rhodes, Jr.
(74) *Attorney, Agent, or Firm* — Cowan, Liebowitz & Latman, P.C.

(57) ABSTRACT

A camera accessory attachable to and detachable from a bottom surface of a camera includes an accessory body, a fastening member configured to attach the accessory body to the bottom surface, an opening that allows a battery to be inserted into and ejected from the camera while the accessory body is attached to the bottom surface, and an accessory lid member attached to the accessory body and movable between an open position for opening the opening and a closed position for closing the opening.

8 Claims, 13 Drawing Sheets

(56) References Cited

FOREIGN PATENT DOCUMENTS

| JP | 2001-075166 A | | 3/2001 |
|---|---|---|---|
| JP | 2001-188295 A | | 7/2001 |
| JP | 2001-242597 A | | 9/2001 |
| JP | 2002-072346 A | | 3/2002 |
| JP | 2002-328424 A | | 11/2002 |
| JP | 2007-195016 A | | 8/2007 |
| JP | 2007-234978 A | | 9/2007 |
| JP | 2012-185250 A | | 9/2012 |
| JP | 2018-107552 A | | 7/2018 |
| KR | 20130004974 U | * | 8/2013 |
| KR | 200470120 Y | | 11/2013 |

OTHER PUBLICATIONS

Archive.org copy of SmallRig 2189 L-Bracket listing at http://www.smallrig.com/smallrig-l-bracket-for-sony-a6300-2189.html dated Jun. 13, 2018 (Year: 2018).*

SmallRig 2189 product page at https://www.smallrigreseller.com/smallrig-l-bracket-for-sony-a6300-2189.html ; retrieved May 27, 2022 (Year: 2022).*

B&H Photo product listing for SmallRig 2191 at https://www.bhphotovideo.eom/c/product/1436948-REG/smallrig_2191_l_bracket_for_panasonic_lumix.html retrieved May 27, 2022 (Year: 2022).*

PCT/IB/338 (PCT Notification of Transmittal of Translation of the International Preliminary Report on Patentability).

PCT/IB/373 (PCT International Preliminary Report on Patentability).

PCT/ISA/237 (PCT Written Opinion of the International Searching Authority).

The foreign patent documents 1-3 and 5-7 were cited in the International Search Report dated Sep. 10, 2019 of the corresponding International Application PCT/JP2019/027156, which is enclosed.

The Foreign Patent Documents were cited in the Nov. 1, 2021 Chinese Office Action, of which is enclosed with an English Translation, that issued in Chinese Patent Application No. 201980052651.6.

The foreign document was cited in a British Office Action dated Nov. 12, 2021, which is enclosed, that issued in the corresponding British Patent Application No. 2101974.0.

The above foreign patent document was cited in the May 12, 2022 Korean Office Action, a copy of which is enclosed without an English Translation, that issued in Korean Patent Application No. 10-2021-7003179.

The above documents were cited in the Aug. 9, 2022 Japanese Office Action, a copy of which is enclosed with an English Translation, that issued in Japanese Patent Application No. 2022-102176.

* cited by examiner

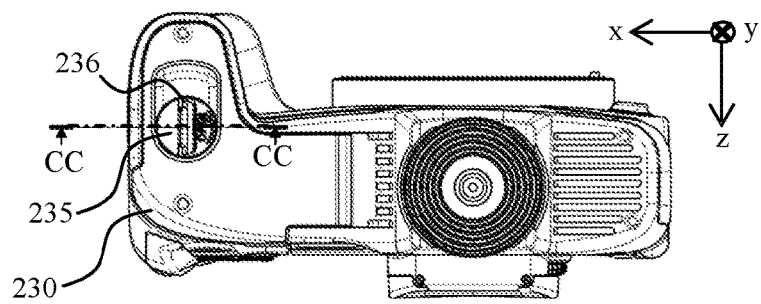
FIG. 8A
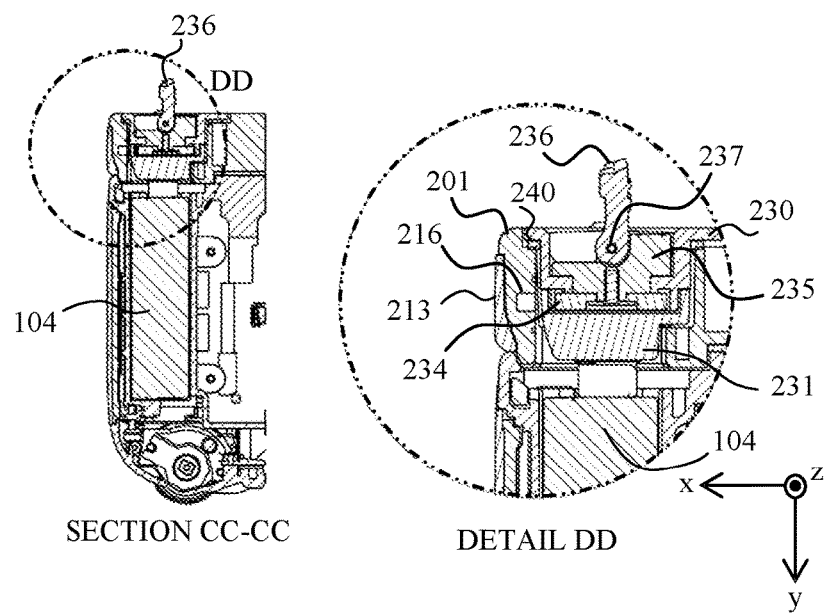
FIG. 8B
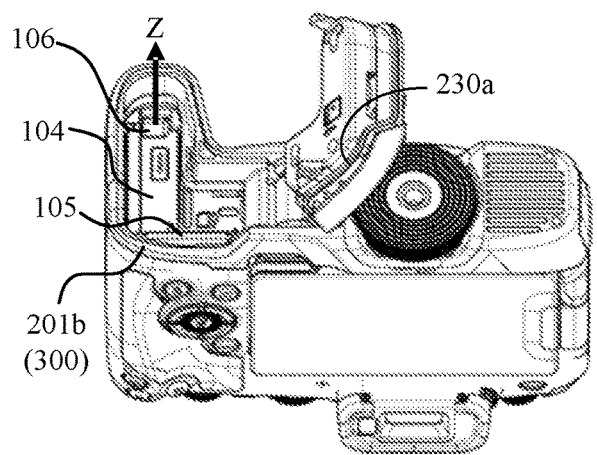 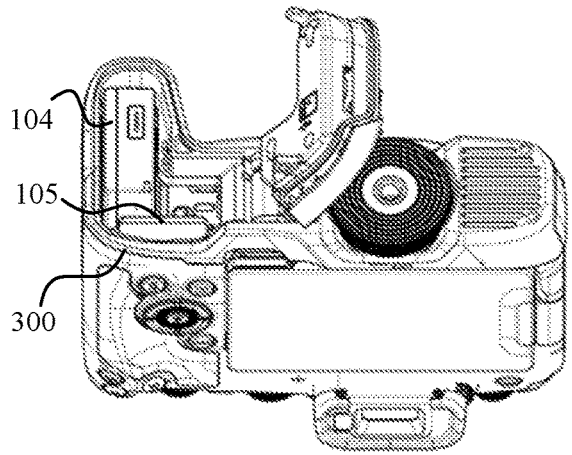
FIG. 9A          FIG. 9B

SECTION GG-GG

DETAIL HH

SECTION JJ-JJ

CAMERA ACCESSORY AND CAMERA

CROSS-REFERENCE TO RELATED APPLICATIONS

This application is a Continuation of International Patent Application No. PCT/JP2019/027156, filed on Jul. 9, 2019, which claims the benefit of Japanese Patent Application No. 2018-150913, filed on Aug. 9, 2018, both of which are hereby incorporated by reference herein in their entirety.

BACKGROUND OF THE INVENTION

Field of the Invention

The present invention relates to a camera accessory attachable to and detachable from a camera.

Description of the Related Art

As the miniaturization of cameras are promoted, auxiliary grips attachable to the cameras have been proposed to users with large hands, which serve as imaging accessories for improving the holding performance of the cameras. Japanese Patent Laid-Open No. 2002-328424 discloses an auxiliary grip detachably attached to a grip portion of a camera. In addition, in order to secure part on which the little finger and/or third finger of the user can rest who holds the camera and to improve the holding performance, there is also provided an auxiliary grip (referred to as an extended grip hereinafter) attachable to the bottom surface of the camera so as to extend the size in the height direction of the camera.

However, when the extended grip is attached to the camera in inserting or ejecting the battery on the bottom surface side of the camera, the user arduously needs to first detach the extended grip from the camera and then to open the lid member on the bottom surface of the camera.

SUMMARY OF THE INVENTION

The present invention provides a camera accessory that allows a battery to be easily inserted into and ejected from a camera while the camera accessory is attached to the bottom surface of the camera.

A camera accessory according to one aspect of the present invention is attachable to and detachable from a bottom surface of a camera. The camera accessory includes an accessory body, a fastening member configured to attach the accessory body to the bottom surface, an opening that allows a battery to be inserted into and ejected from the camera while the accessory body is attached to the bottom surface, and an accessory lid member attached to the accessory body and movable between an open position for opening the opening and a closed position for closing the opening.

A camera mounted with the above camera accessory also constitutes another aspect of the present invention.

Further features of the present invention will become apparent from the following description of exemplary embodiments with reference to the attached drawings.

BRIEF DESCRIPTION OF THE DRAWINGS

FIGS. 8A and 8B are diagrams showing an unlocked state of the grip lid member.

FIGS. 9A and 9B are diagrams showing the grip lid member in an open position.

DESCRIPTION OF THE EMBODIMENTS

Figure 1:
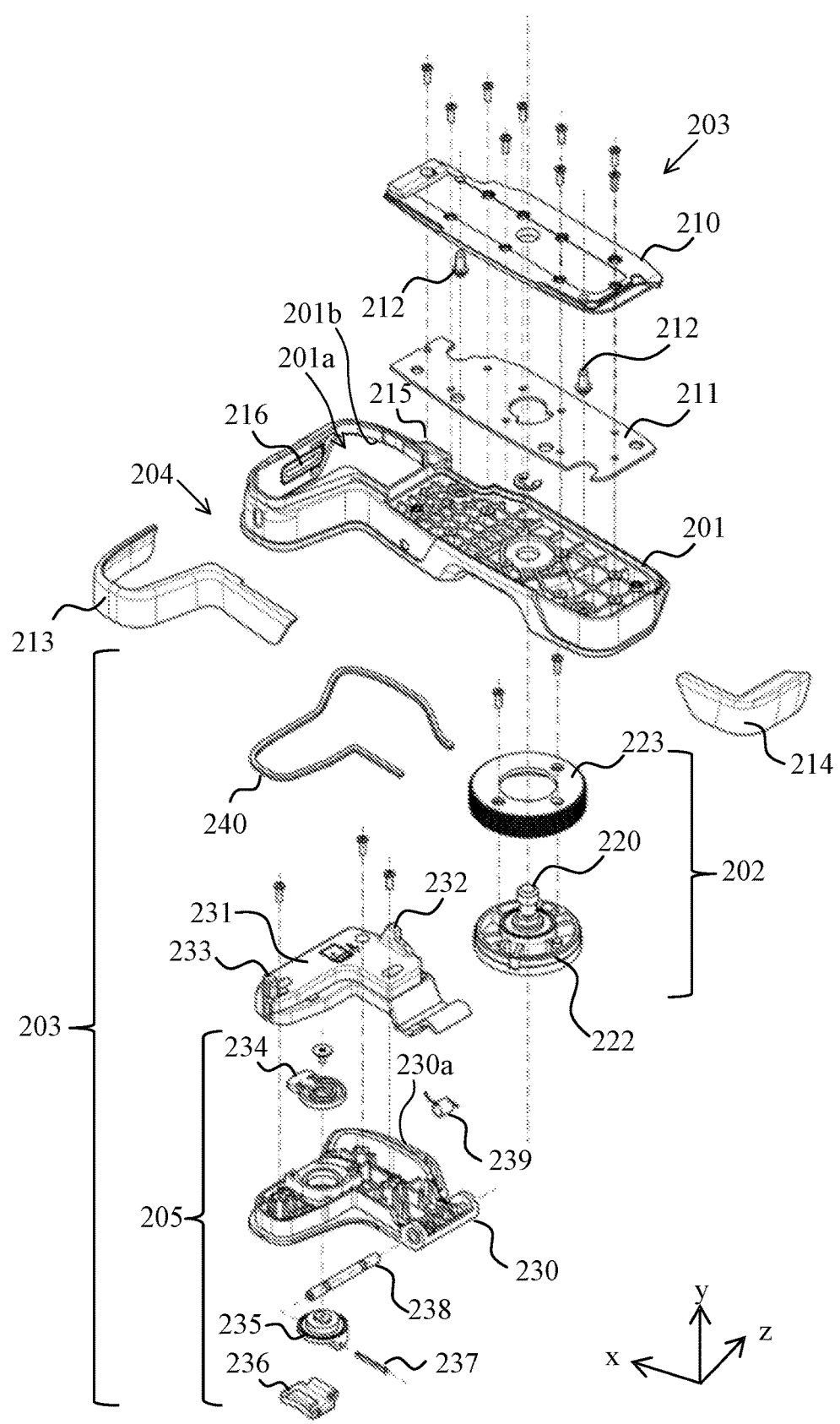
FIG. 1 is an exploded perspective view of an extended grip according to an embodiment of the present invention.

Referring now to the drawings, a description will be given of embodiments of the present invention.

Referring now to FIGS. 1 to 3B, a description will be given of a configuration of an extended grip 200 serving as a camera accessory according to one embodiment of the present invention. The extended grip 200 is attachable to and detachable from a bottom surface of a camera (a camera body as a lens interchangeable type image pickup apparatus in this embodiment) described later.

Figure 2A:
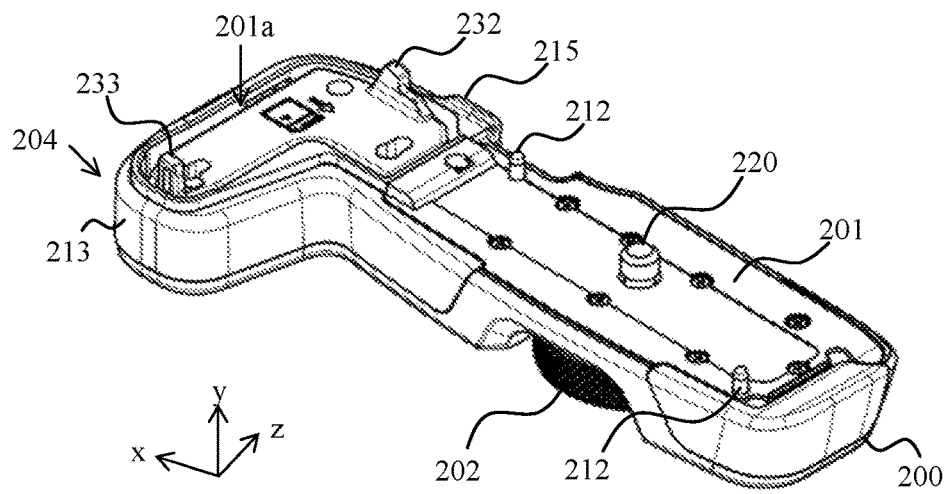
FIGS. 2A to 2C are a front perspective view, a rear perspective view, and a bottom view of the extended grip according to the embodiment.
Figure 2B:
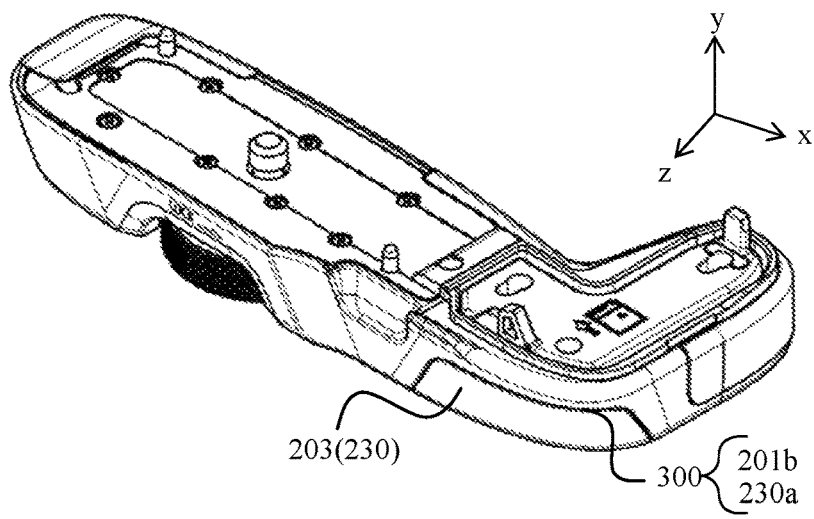
Figure 2C:
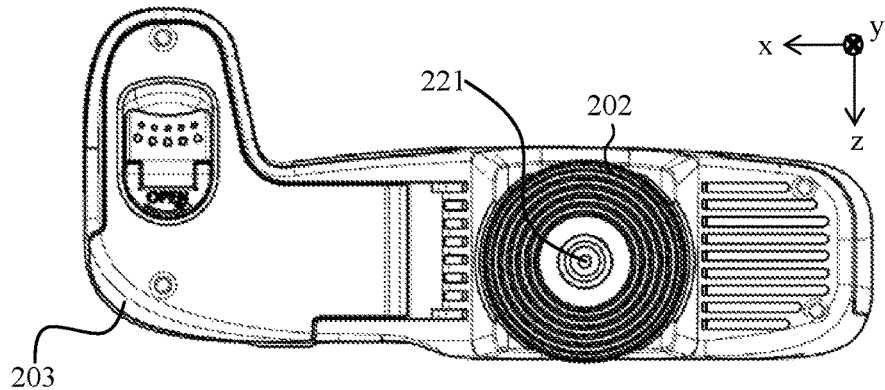
Figure 3B:
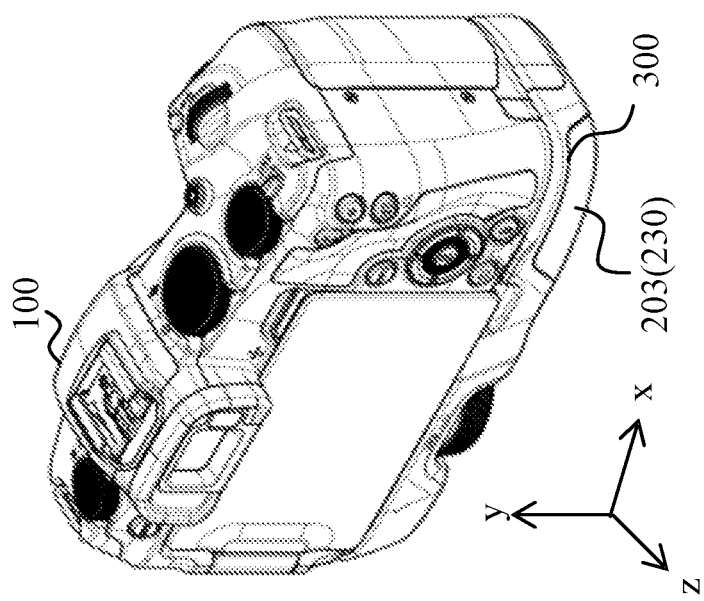
FIGS. 3A and 3B are a front perspective view and a rear perspective view of a camera mounted with the extended grip according to the embodiment.
Figure 3A:
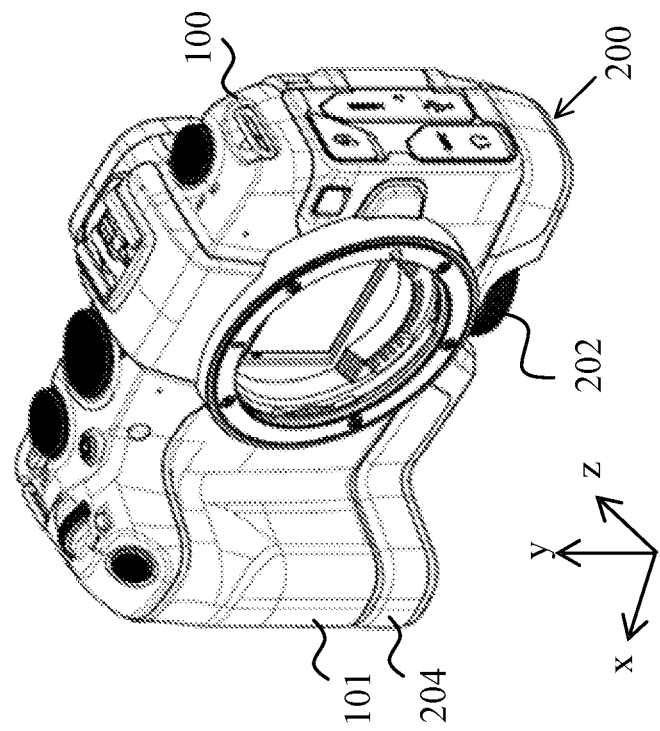

FIG. 1 illustrates the exploded extended grip 200. FIG. 2A illustrates the extended grip 200 obliquely viewed from the front side, and FIG. 2B illustrates the extended grip 200 obliquely viewed from the rear side. FIG. 2C illustrates the extended grip viewed from the bottom surface side. Further, FIGS. 3A and 3B illustrate a camera 100 mounted with the extended grip 200, which is obliquely viewed from the front side and the rear side, respectively.

In these figures, +y and −y directions indicate upper and lower sides, respectively, and +z and −z directions indicate an object side (front side) and a rear side, respectively. Further, +x and −x directions indicate right and left sides viewed from the rear side, respectively.

The extended grip 200 includes a grip housing 201 serving as an accessory body, a fastening member 202, and a grip lid member 203 serving as an accessory lid member.

A housing cover 210, a sheet metal member 211, a positioning pin 212, and rubber parts 213 and 214 are attached to the grip housing 201. The sheet metal member 211 is attached to the top surface of the grip housing 201 to increase the strength of the grip housing 201. More specifically, the sheet metal member 211 is tightened together with the housing cover 210 which forms the uppermost surface of the grip housing 201 from the +y direction by screws, and is sandwiched between the grip housing 201 and the housing cover 210.

The positioning pin 212 is a part for determining the positional relationship between the extended grip 200 (grip housing 201) and the camera 100, and is sandwiched between the grip housing 201 and the housing cover 210.

The grip housing 201 and the housing cover 210 are made by molding resin, such as polycarbonate. However, it may be made by carving from metal, such as aluminum. The sheet metal member 211 and the positioning pin 212 are made by pressing or cutting metal, such as SUS.

Each of the rubber parts 213 and 214 is bonded through an unillustrated double-sided tape or the like to part on which part of the hand can rest when the user holds the camera 100 mounted with the extended grip 200. The rubber parts 213 and 214 have cushioning properties and improve the feel when the camera 100 is held.

In FIG. 3A, the camera 100 has a camera grip portion 101 on the front right side thereof, and the extended grip 200 has a grip extender 204 that extends downwardly from the camera grip portion 101. The grip extender 204 is part on which part of the hand (mainly the third finger and/or little finger) can rest when the user holds the camera 100 mounted with the extended grip 200. That is, when the extended grip 200 is attached to the camera 100, the grip extender 204 is added to the camera grip portion 101 in the −y direction and consequently the grip portion that can be held by the user is extended.

The fastening member 202 includes a first fastener 220, a second fastener 221, a fastening base member 222, and a cap 223, and is rotatably held by the grip housing 201 around an axis extending in the ±y directions. The fastening member 202 is a part for attaching the extended grip 200 (grip housing 201) to the camera 100.

The first fastener 220 and the second fastener 221 are male and female threads coaxially provided on the outer and inner circumferences of one metal component, respectively. The first fastener 220 can be fastened to a tripod female thread portion (tripod fastener: which will be described later) provided in the bottom surface of the camera 100. Thereby, the extended grip 200 is attached to the bottom surface of the camera 100. Further, a male thread portion provided on a seat surface (tripod seat) of a tripod (not shown) can be tightened to the second fastener 221. Thereby, the extended grip 200 and the camera 100 mounted with it are fixed to the tripod.

By providing the second fastener 221 to the fastening member 202 having the first fastener 220, it is unnecessary to separately provide a fastening member to be fixed onto the tripod, and the number of components can be reduced.

The fastening base member 222 is provided by two-color molding or the like on the outer circumferential portion of the metal part provided with the first fastener 220 and the second fastener 221. The cap 223 as an external component is attached to the fastening base member 222 by a screw from the +y direction so as to cover the fastening base member 222.

The first fastener 220, the second fastener 221, the fastening base member 222, and the cap 223 may be integrally made with metal. The fastening member 202 can be rotated from either the front or the back of the camera 100.

The grip lid member 203 includes a lid base member 230, a lid cover 231, a lid attachment shaft 238, an opening spring 239, a drip-proof member 240, and a lid lock portion 205. The grip lid member 203 is attached to the grip housing 201 and rotatable (movable) around the lid attachment shaft 238 that extends in the ±z directions, between an open position for opening an opening 201a formed in the grip housing 201 and a closed position for closing the opening 201a. The opening 201a allows a battery and a medium to be inserted into and ejected from the battery chamber in the camera 100 through a slot (insertion/ejection port) provided in the bottom surface of the camera 100 while the extended grip 200 is attached to the bottom surface of the camera 100.

The lid base member 230 is rotatably attached to the grip housing 201 by inserting the lid attachment shaft 238 into a hole provided in the lid base member 230 and a hole provided in the grip housing 201.

The lid cover 231 is attached to the upper surface (inner surface) of the lid base member 230 with screws so as to cover it. A pressing part (contact part) 232 and a stopper part 233 are provided on the outer surface of the lid cover 231. While the grip lid member 203 is located at the closed position, the pressing part 232 contacts the power supply detecting member 108 provided on the camera 100 and presses it. Further, the stopper part 233 is engaged with a battery holder, which will be described later, provided in the battery chamber so as to hold the battery housed in the battery chamber of the camera 100. The lid base member 230 and the lid cover 231 are made by molding resin, such as polycarbonate.

As illustrated in FIG. 1, of the frame portion surrounding the opening 201a in the grip housing 201, the rear part 201b on the side opposite to the grip extender 204 has a shape cut out in the +y direction from the front part and the side part. This portion will be also referred to as a notch portion 201b hereinafter. On the other hand, the rear part 230a of the lid base member 230 has a shape protruding in the +y direction from the front part and the side part. This portion will be also referred to as a protrusion 230a hereinafter. The protrusion 230a is formed so that its shape matches the shape of the notch portion 201b. When the grip lid member 203 is closed at the closed position, as illustrated in FIG. 2B, the ends of the notch portion 201b and the protrusion 230a face each other to form a dividing line 300 which is a boundary between them. The reason why the notch portion 201b is provided to the grip housing 201 will be described later.

The lid lock portion 205 includes a rotation lock member 234, a pedestal 235, a knob member 236, and a knob shaft 237. The knob member 236 is rotatably attached to the pedestal 235 by inserting the knob shaft 237 that extends in the x direction, into a space between the pedestal 235 and the pedestal 235.

The rotation lock member 234 is disposed so as to sandwich the lid base 230 member with the pedestal 235, and coupled to the pedestal 235 from the +y direction by a screw. The rotation lock member 234 is rotatable between a lock position and an unlock position by rotating a knob member 236 attached to the pedestal 235 around an axis extending in the ±y directions. While the grip lid member 203 is closed at the closed position, the rotation lock member 234 located at the lock position is engaged with an lock engagement hole portion 216 formed in the grip housing 201. Thereby, the grip lid member 203 is engaged at the closed position. Further, the rotation lock member 234 is disengaged from the lock engagement hole portion 216 at the unlock position. Thereby, the grip lid member 203 can rotate from the closed position to the open position.

The opening spring 239 is a torsion coil spring, and the coil portion is disposed on the outer circumference of the lid attachment shaft 238, one of the two arms contacts the grip housing 201 and the other contacts the lid base member 230. Thereby, when the rotation lock member 234 is located at the unlock position, the grip lid member 203 is rotated toward the open position relative to the grip housing 201 by the biasing force of the opening spring 239.

The rotation lock member 234, the pedestal 235, and the knob member 236 are made by molding resin, such as polycarbonate and polyacetal. Further, the lid attachment shaft 238 is made by pressing or cutting metal such as SUS.

The drip-proof member 240 is a buffer material, such as urethane foam, and is attached to the lid base member 230 with an unillustrated double-sided tape or the like. When the grip lid member 203 is located at the closed position, the drip-proof member 240 is pressed between the grip housing 201 and the lid base member 230 and crushed to seal the space between them. Thereby, the drip-proof performance around the battery and the medium housed in the camera body 100 is improved.

Figure 4A:
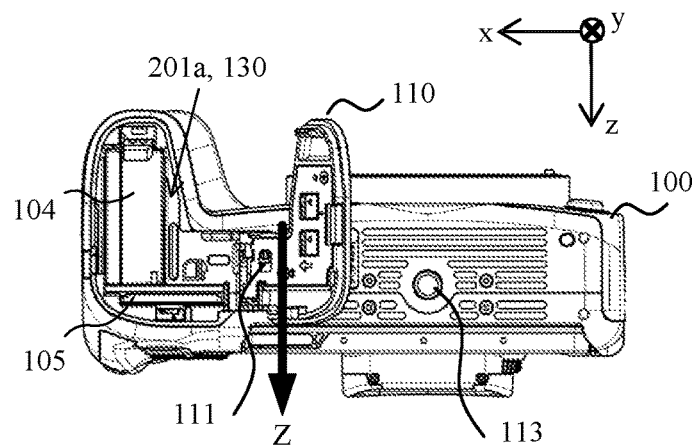
FIGS. 4A to 4C are diagrams showing a detachment of a camera lid member from a camera.
Figure 5B:
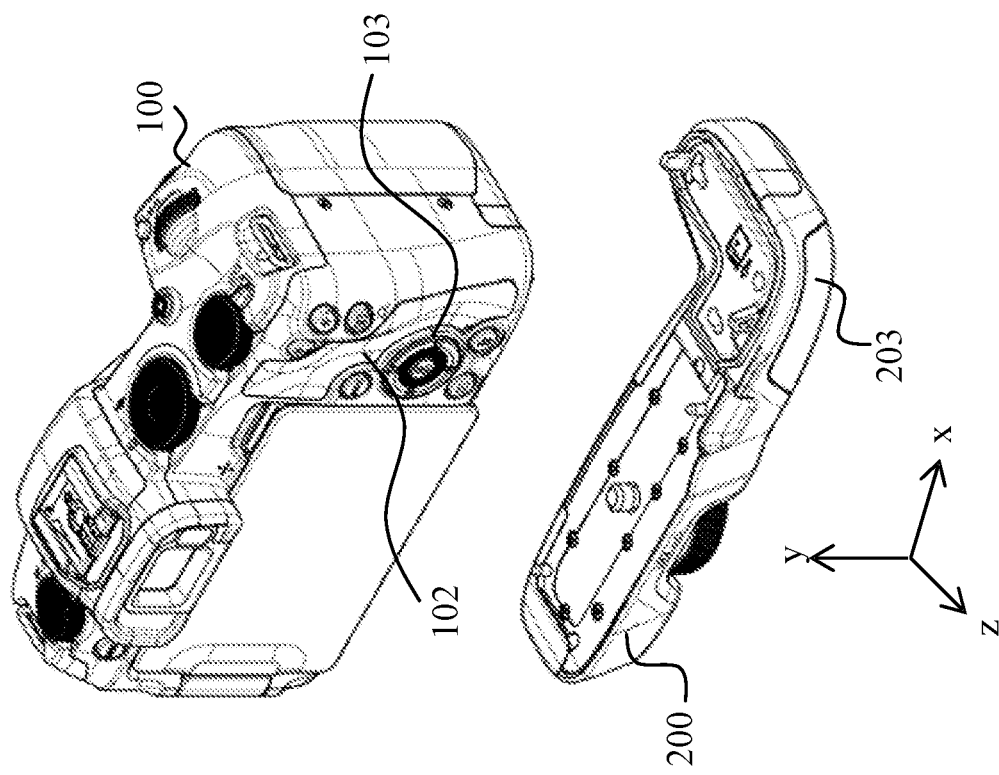
FIGS. 5A and 5B are a front perspective view and a rear perspective view of the extended grip and the camera according to the embodiment.

Referring now to FIGS. 4A and 5B, a description will be given of a procedure of attaching the extended grip 200 to the camera 100. FIG. 4A illustrates the lid member (referred to as a camera lid member hereinafter) 110 located at the open position of the camera 100 viewed from the bottom surface side. Behind the opening 201a in the extended grip 20, the battery 104 and a medium 105 inserted in the battery chamber and the medium slot in the camera 100 are seen through the insertion/ejection port 130 on the bottom surface of the camera 100. The medium 105 records image data obtained by imaging with the camera 100.

Figure 4B:
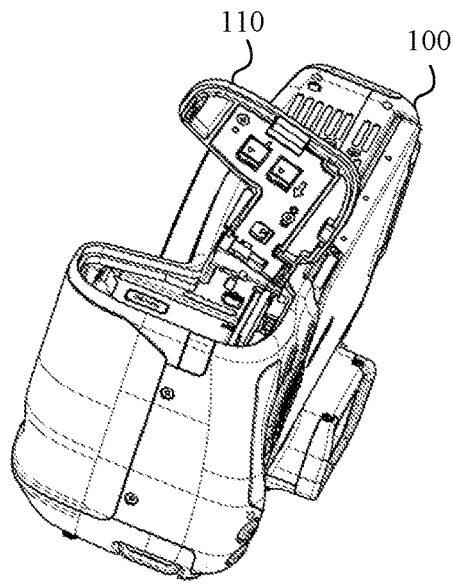
Figure 4C:
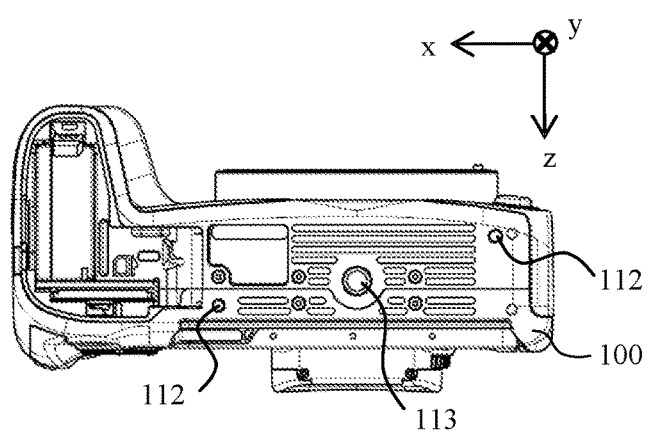
Figure 5A:
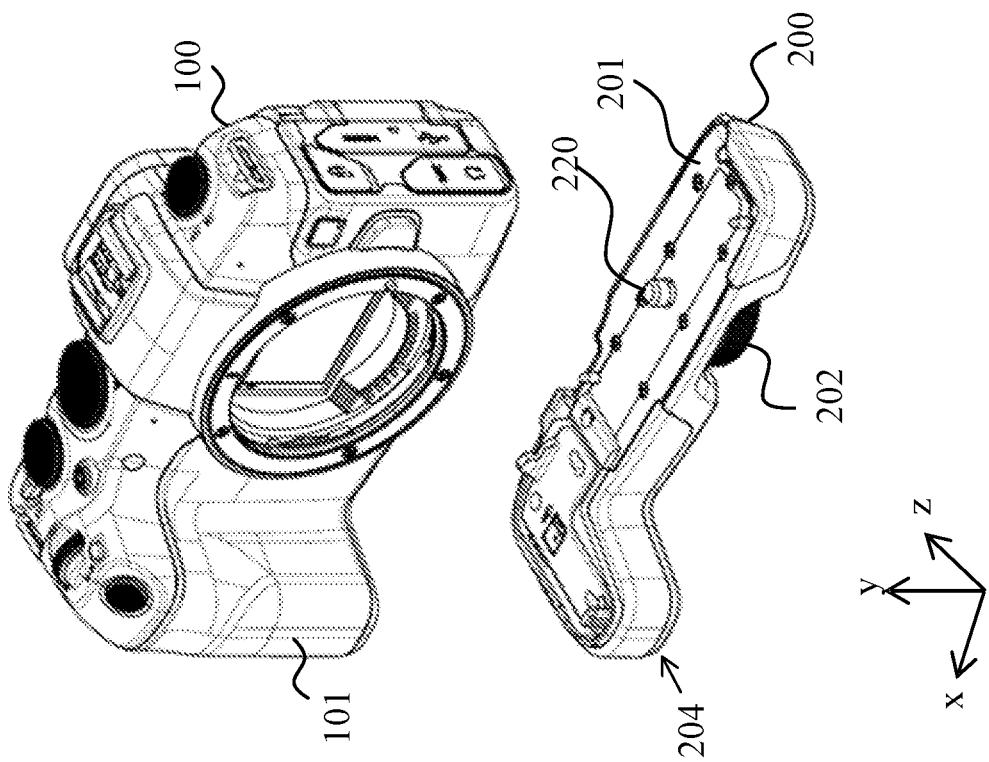

FIG. 4B illustrates how the camera lid member 110 is detached from the camera 100. FIG. 4C illustrates the camera 100 from which the camera lid member 110 has been detached. FIGS. 5A and 5B illustrate the camera 100 and the extended grip 200 obliquely viewed from the front side and the rear side, respectively.

In attaching the grip housing 201 to the bottom surface of the camera 100, it is first necessary to detach the camera lid member 110 from the camera 100. When the camera lid member 110 is located at the open position, the user pulls a detachment lever 111 in the +z direction (FIG. 4A), so that an unillustrated shaft member that has attached the camera lid member 110 to the camera 100 retracts into the camera lid member 110 (FIG. 4B). Thereby, the camera lid member 110 can be detached from the camera 100 (FIG. 4C).

The bottom surface of the camera 100 is provided with the above tripod female thread portion 113 and the grip positioning hole portion 112. The male thread portion provided on the tripod mount and the first fastener 221 of the extended grip 200 can be tightened to the tripod female thread portion 113. The rotation positioning pin 212 of the extended grip 200 attached to the bottom surface of the camera 100 is inserted into the grip positioning hole portion 112. Thereby, the extended grip 200 is positioned relative to the camera body 100.

As illustrated in FIGS. 5A and 5B, the user brings the extended grip 200 closer to the camera 100 from the bottom surface side (−y direction), and inserts the positioning pin 212 into the grip positioning hole portion 112. Thereafter, the fastening member 202 is rotated in the tightening direction to tighten the first fastener 220 to the tripod female thread portion 113. Thereby, the extended grip 200 is attached to the bottom surface of the camera 100.

Figure 6A:
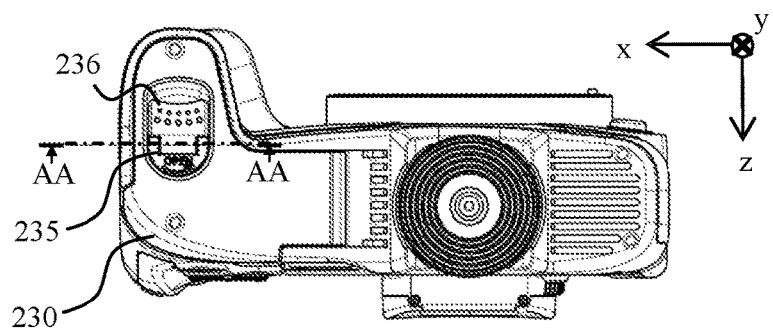
FIGS. 6A and 6B are diagrams showing a locked state of the grip lid member according to the embodiment.

Referring now to FIGS. 6A to 10B, a description will be given of an opening/closing operation of the grip lid member 203 in the extended grip 200. FIG. 6A illustrates the bottom surface of the extended grip 200 attached to the camera 100 when the rotation lock member 234 illustrated in FIG. 1 is located at the lock position. FIG. 6B illustrates an AA-AA section in FIG. 6A and enlarges a BB part in the section.

Figure 7A:
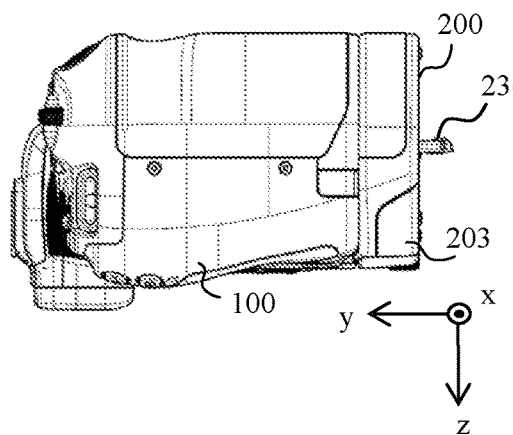
FIGS. 7A and 7B are diagrams showing a raised state of a knob member of the grip lid member.
Figure 7B:
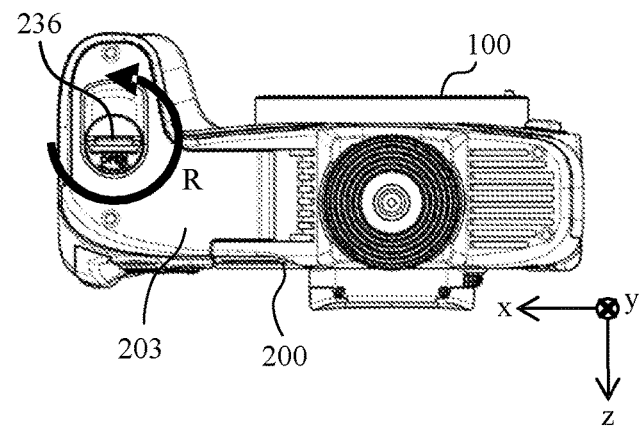

FIGS. 7A and 7B illustrate the side surfaces of the extended grip 200 and the camera 100 and the bottom surface of the extended grip 200 while the knob member 236 is raised, respectively.

Figure 10A:
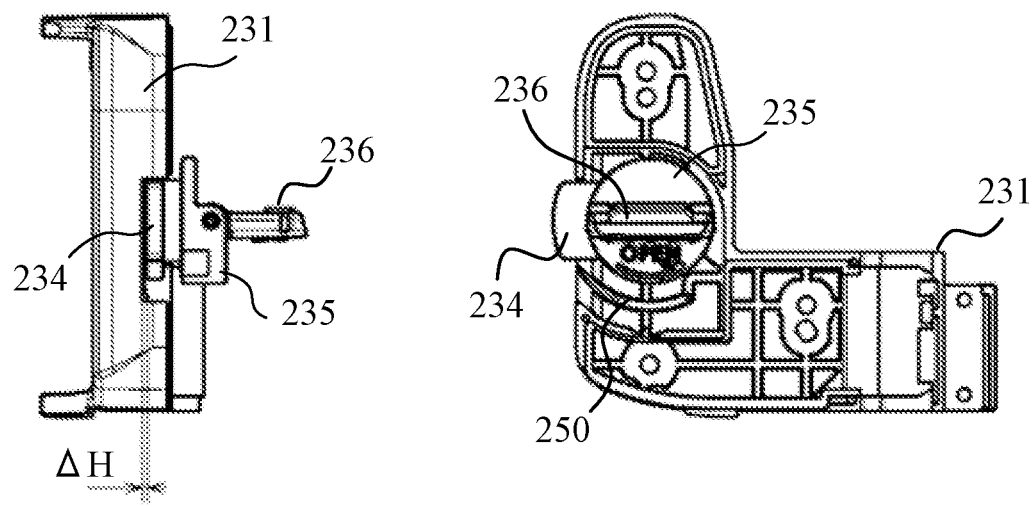
FIGS. 10A and 10B are diagrams showing a rotation lock member of the grip lid member.
Figure 10B:
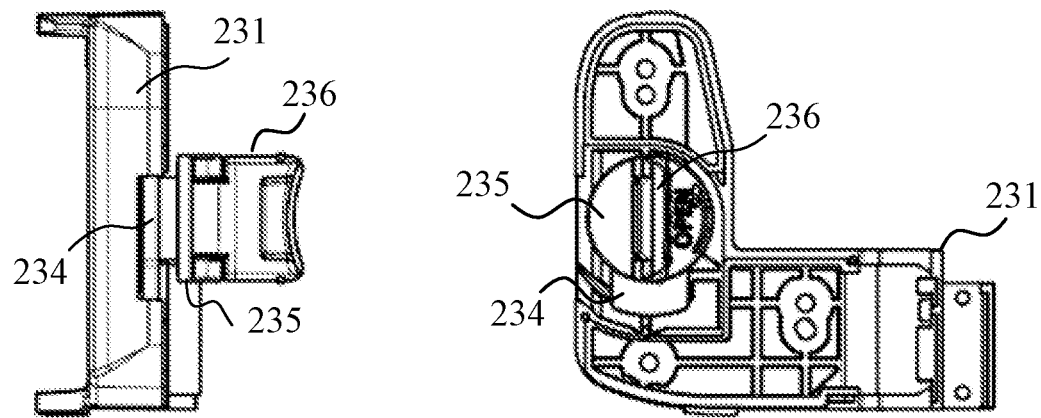

FIG. 8A illustrates the bottom surface of the extended grip 200 attached to the camera 100 when the rotation lock member 234 is located at the unlock position. FIG. 8B illustrates a CC-CC section in FIG. 8A, and enlarges a DD part in the section. FIG. 9A illustrates the extended grip 200 and the camera 100 when the grip lid member 203 is located at the open position. FIG. 9B illustrates the battery 104 and the medium 105 are disengaged from the state illustrated in FIG. 9A in order to eject them. FIGS. 10A and 10B illustrate the lid cover member 231 and the lid lock portion 205 (rotation lock member 234, pedestal 235, and knob member 236) viewed from the bottom surface side and the side surface side, respectively.

Figure 6B:
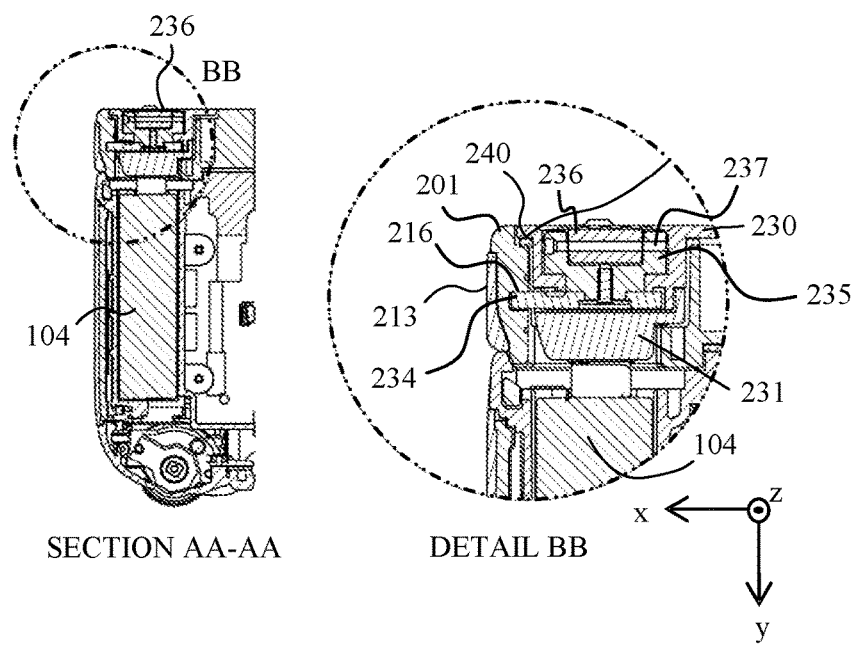

In FIGS. 6A and 6B, the rotation lock member 234 is located at the lock position and is engaged with the lock engagement hole portion 216 formed in the grip housing 201. Therefore, the grip lid member 203 is engaged at the closed position. The knob member 236 can be rotate between a storage position (FIGS. 6A and 6B) stored relative to the lid base member 230 around the knob shaft 237 as a center and a raised position (FIGS. 7A and 7B).

As the user rotates the knob member 236 located at the raised position, in an R direction illustrated in FIG. 7B, the rotation lock member 234 rotates relative to the pedestal 235 and the lid base member 230 to the unlock position illustrated in FIGS. 8A and 8B. As illustrated in FIG. 8B, the rotation lock member 234 located at the unlock position retracts from the lock portion locking hole portion 216, whereby the grip lid member 203 is disengaged at the closed position. As illustrated in FIG. 9A, the grip lid member 203 that is disengaged at the closed position is rotated to the open position by the biasing force of the opening spring 239.

In the state of FIG. 9A, the users fingers can access the battery 104 and the medium 105 housed in the battery chamber and the medium slot in the camera 100, respectively, and insert and eject them.

The battery 104 housed in the battery chamber is held in the battery chamber by the battery holder 106 which is spring-loaded in the +z direction and located at the battery holding position. The user can eject the battery 104 by pushing the battery holder 106 in the −z direction with his finger and by moving the battery holder 106 to the holding release position. Further, the medium 105 stored in the medium slot can be ejected by the user pushing the medium 105 toward the back of the medium slot with his finger to release the holding in the medium slot. FIG. 9B illustrates holding release states of the battery 104 and the medium 105, and they are slightly popped up from the battery chamber and the medium slot by the springs in the battery chamber and the medium slot.

At this time, as described above, the grip housing 201 is provided with the notch portion 201b, and a distance from the end of the notch portion 201b to the battery 104 and the medium 105 is shortened. Therefore, the user's finger can easily reach the battery 104 and the medium 105 through the opening 201a, and the battery 104 and the medium 105 can be easily inserted and ejected.

FIGS. 10A and 10B omit the lid base member 230. Provided on the lower surface of the lid cover 231 is a convex part 250 that extends in an arc shape around the rotation center of the rotation lock member 234 and the pedestal 235 and downwardly projects. FIG. 10A illustrates the rotation lock member 234 located at the lock position and the grip lid member 203 engaged at the closed position. FIG. 10B illustrates the rotation lock member 234 located at the unlock position and the grip lid member 203 located at the open position. The height of the convex part 250 gradually increases from the lock position of the rotation lock member 234 to the unlock position, and has a height of ΔH at the unlock position. A frictional force is generated between the rotation lock members 234 located at the unlock position and the convex part 250, and the frictional force prevents the rotation lock member 234 from inadvertently rotating toward the lock position.

Figure 11A:
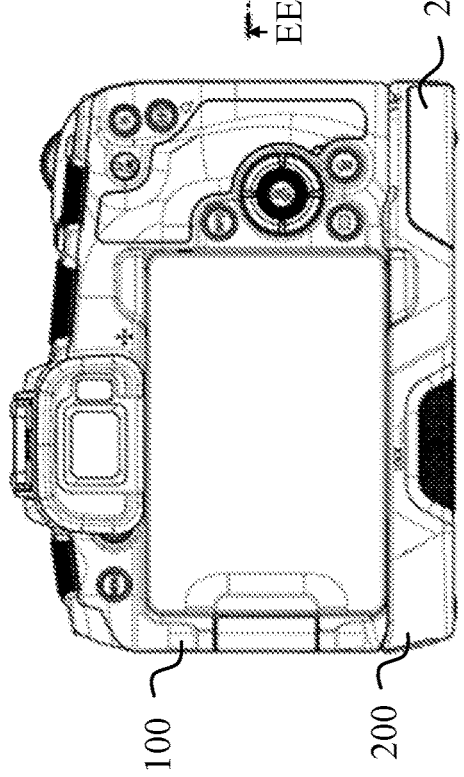
FIGS. 11A to 11C are diagrams showing a relationship between the grip lid member in a closed position and a battery loading detection switch.
Figure 11B:
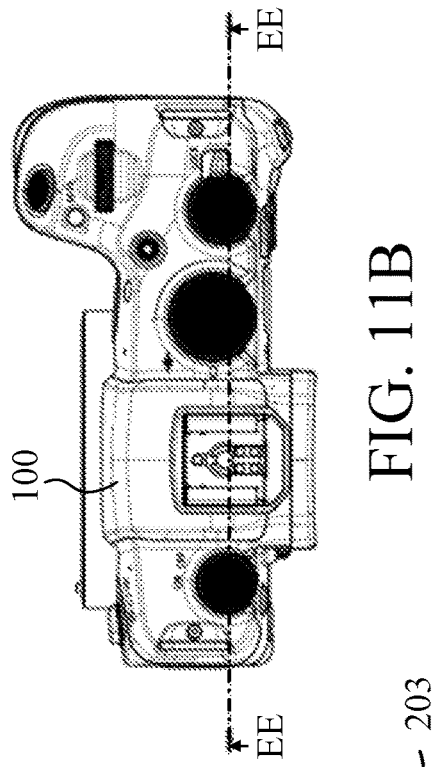

Referring now to FIGS. 11A to 14B, a description will be given of the pressing part 232 and the stopper part 233 of the housing cover 210. FIG. 11A illustrates the extended grip 200 when the grip lid member 203 is located at the closed position and the rear surface of the camera 100 mounted with the extended grip 200. FIG. 11B illustrates the top surface of the camera 100 (and the extended grip 200) illustrated in FIG. 11A, and FIG. 11C illustrates an EE-EE section in FIG. 11B and enlarges an FF part in the section. FIG. 12A illustrates the extended grip 200 when the grip lid member 203 is slightly opened from the closed position, and the rear surface of the camera 100 mounted with the extended grip 200. FIG. 12B illustrates the top surface of the camera 100 (and the extended grip 200) illustrated in FIG. 12A, and FIG. 12C illustrates a GG-GG section in FIG. 12B and enlarges a HH part in the section.

Figure 11C:
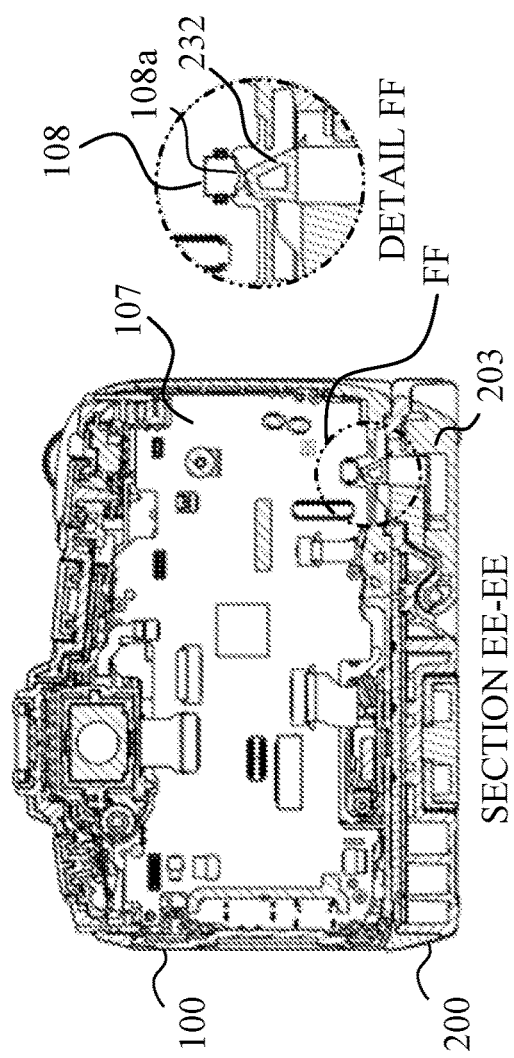

As illustrated in FIG. 11C, an electric circuit board 107 is disposed inside the camera 100. A battery loading detection switch (battery loading detector) 108 is provided near the battery chamber of the electric circuit board 107. The battery loading detection switch 108 has a lever portion 108a, and is turned on when the camera lid member 110 is attached to the camera 100 as illustrated in FIG. 4A and the pressing part provided on the camera lid member 110 pushes the lever portion 108a. When the battery loading detection switch 108 is turned on, an camera controller (not shown) such as a CPU or MPU mounted on the electric circuit board 107 detects loading of the battery into the camera 100 (its storage in the battery chamber and closure of the lid member), and starts the power supply from the battery to each part in the camera 100.

As illustrated in FIG. 11C, when the extended grip 200 is attached to the camera 100 from which the camera lid member 110 has been detached, the pressing part 232 provided on the lid cover 231 of the grip lid member 203 closed at the closed position presses the lever portion 108a of the battery loading detection switch 108. Thereby, the battery loading detection by the battery loading detection switch 108 is turned on.

Figure 12A:
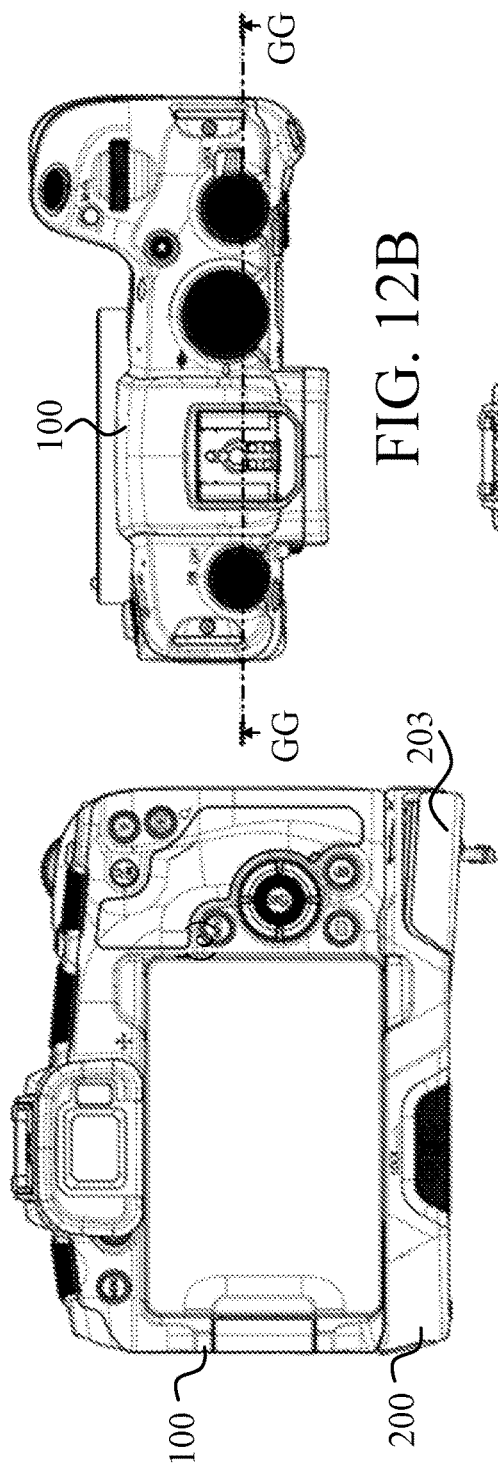
FIGS. 12A to 12C are diagrams showing a relationship between the grip lid member in the open position and the battery loading detection switch.
Figure 12B:
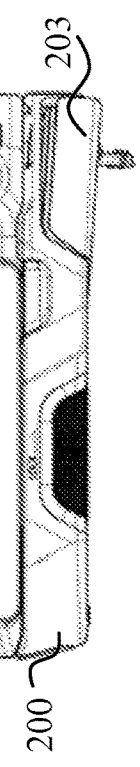
Figure 12C:
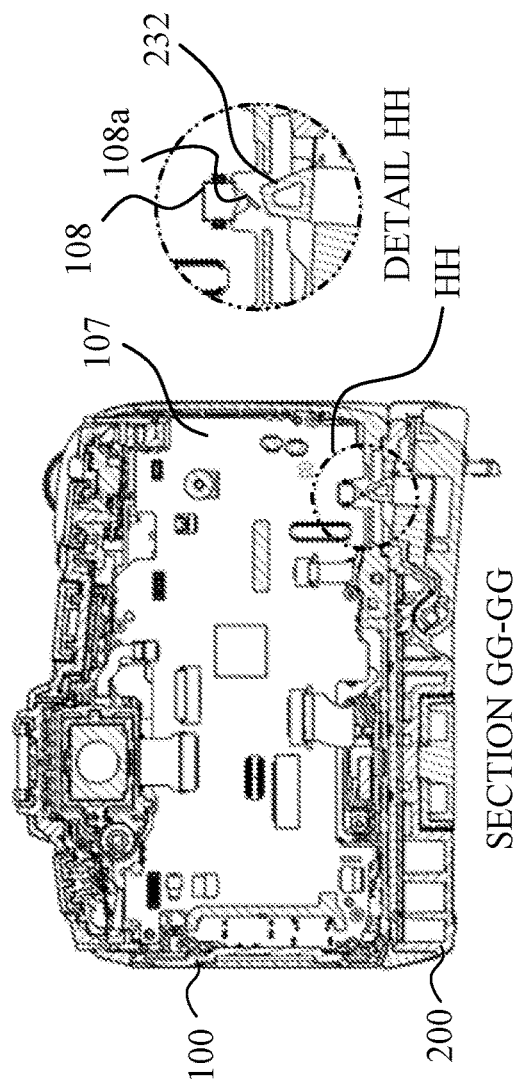

Further, as illustrated in FIG. 12C, when the grip lid member 203 is opened from the closed position, the pressing part 232 is separated from the lever portion 108a of the battery loading detection switch 108, so that the battery loading by the battery loading detection switch 108 is turned off.

Thus, the grip lid member 203 includes the pressing part 232 instead of the pressing part of the camera lid member 110, and can turn on and off the battery loading detection by the battery loading detection switch 108.

Further, when the grip lid member 203 located at the closed position is further pressed in the closing direction (+y direction) by the external force, the pressing part 232 excessively presses the lever portion 108a of the battery loading detection switch 108, and the battery loading detection switch 108 may get damaged. On the other hand, if the pressing part 232 does not sufficiently press the lever portion 108a even though the grip lid member 203 is located at the closed position, the battery loading detection switch 108 does not normally perform the battery loading detection. Therefore, this embodiment sets the position of the pressing part 232 in the ±y directions to be equal to the pressing part of the camera lid member 110.

Figure 13A:
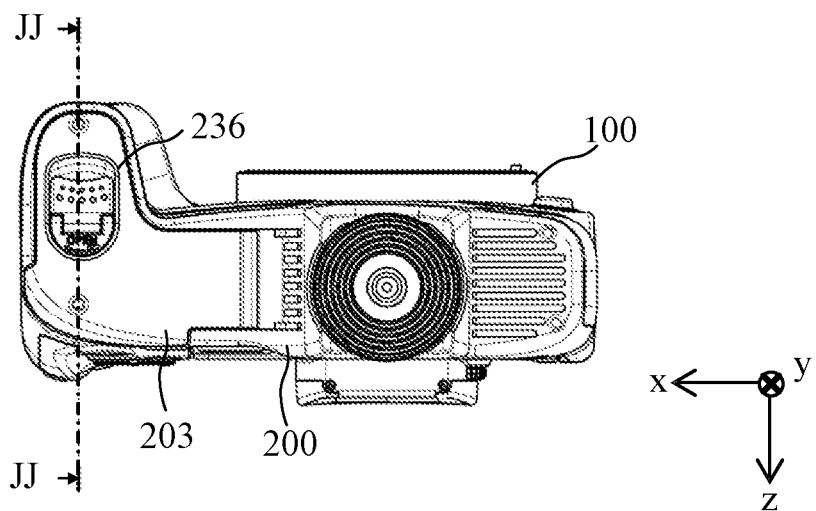
FIGS. 13A and 13B are diagrams showing a holding state of a battery holder by a grip lid member in a closed position.
Figure 13B:
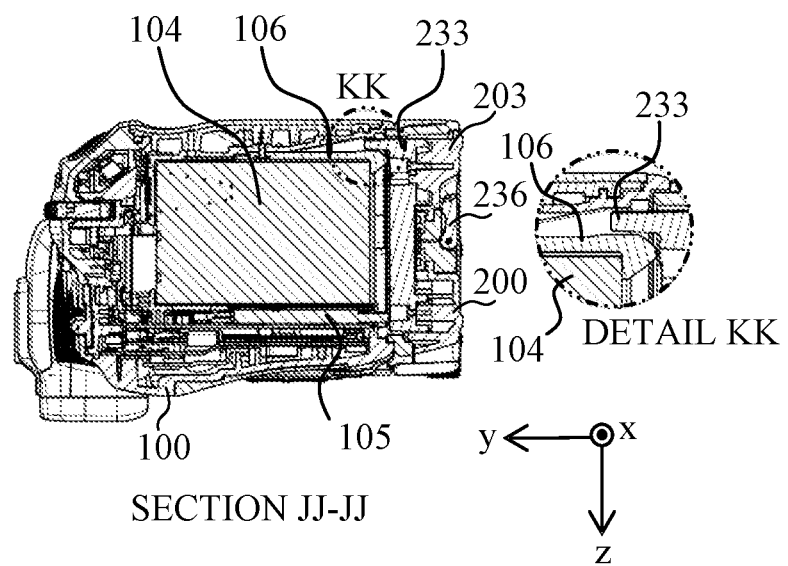
Figure 14A:
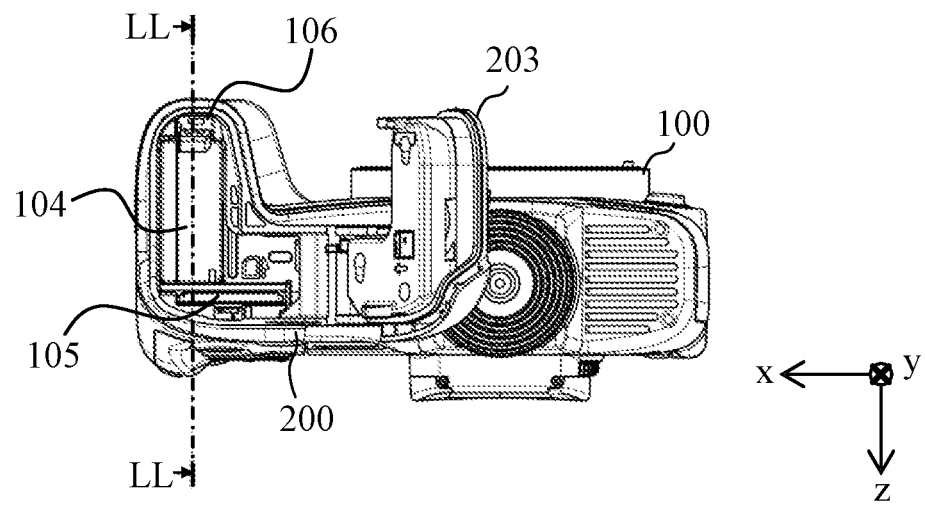
FIGS. 14A and 14B are diagrams showing a holding release state of a battery holder by the grip lid member in the open position.
Figure 14B:
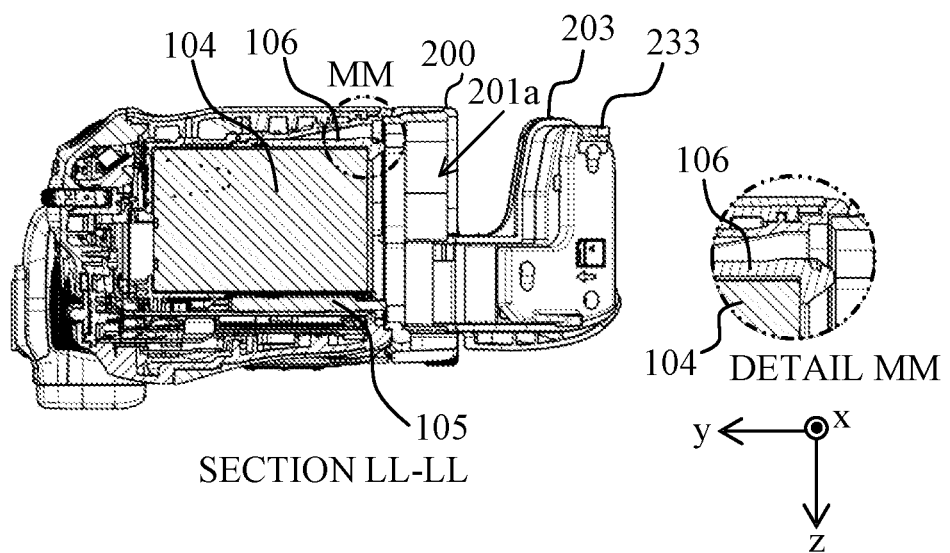

FIG. 13A illustrates the bottom surface of the extended grip 200 and (the camera 100 mounted with it) when the grip lid member 203 is located at the closed position. FIG. 13B illustrates a JJ-JJ section in FIG. 13A and enlarges a KK portion of the section. FIG. 14A illustrates the bottom surface of the extended grip 200 and (the camera 100 mounted with it) when the grip lid member 203 is located at the open position. FIG. 14B illustrates an LL-LL section in FIG. 14A and enlarges an MM part in the section.

As illustrated in FIG. 13B, the battery holder 106 provided in the battery chamber of the camera 100 is engaged with the end surface of the battery 104 housed in the battery chamber at the battery holding position to hold the battery 104 in the battery chamber. The stopper part 233 provided on the lid cover 231 of the grip lid member 203 located at the closed position contacts the surface on the −z side of the battery holder 106 and restricts the battery holder 106 from moving in the −z direction (to the holding release position) or holding of the battery 104 from being released. Thereby, when an impact is applied to the camera 100 mounted with the extended grip 200, the battery holder 106 is prevented from displacing from the battery holding position to the holding release position, and the battery 104 is prevented from coming out of the battery chamber.

As illustrated in FIG. 14B, when the grip lid member 203 is located at the open position, the stopper part 233 is separated from the battery holder 106, so that the battery holder 106 can move in the −z direction from the battery holding position. When the user pushes the battery holder 106 in the −z direction with his finger to move the battery holder 106 to the holding release position, the holding of the battery 104 is released, and the battery 104 can be ejected from the camera 100.

Thus, the extended grip 200 according to this embodiment includes the grip lid member 203 that serves to turn on the battery loading detection switch 108 and to restrict the battery holder 106 from moving, similarly to the camera lid member 110.

The pressing part 232 and the stopper part 233 may be provided on the lid base member 230 instead of the lid cover 231.

As described above, the extended grip 200 according to this embodiment has the grip extender 204, so that the holding performance of the camera 100 can be improved for users with large hands. Moreover, since the extended grip 200 includes a grip lid member 203 having the same functions as those of the camera lid member 110, the user can easily insert and eject the battery 104 and the medium 105 while the extended grip 200 is attached to the camera 100.

Figures 15A, 15B:
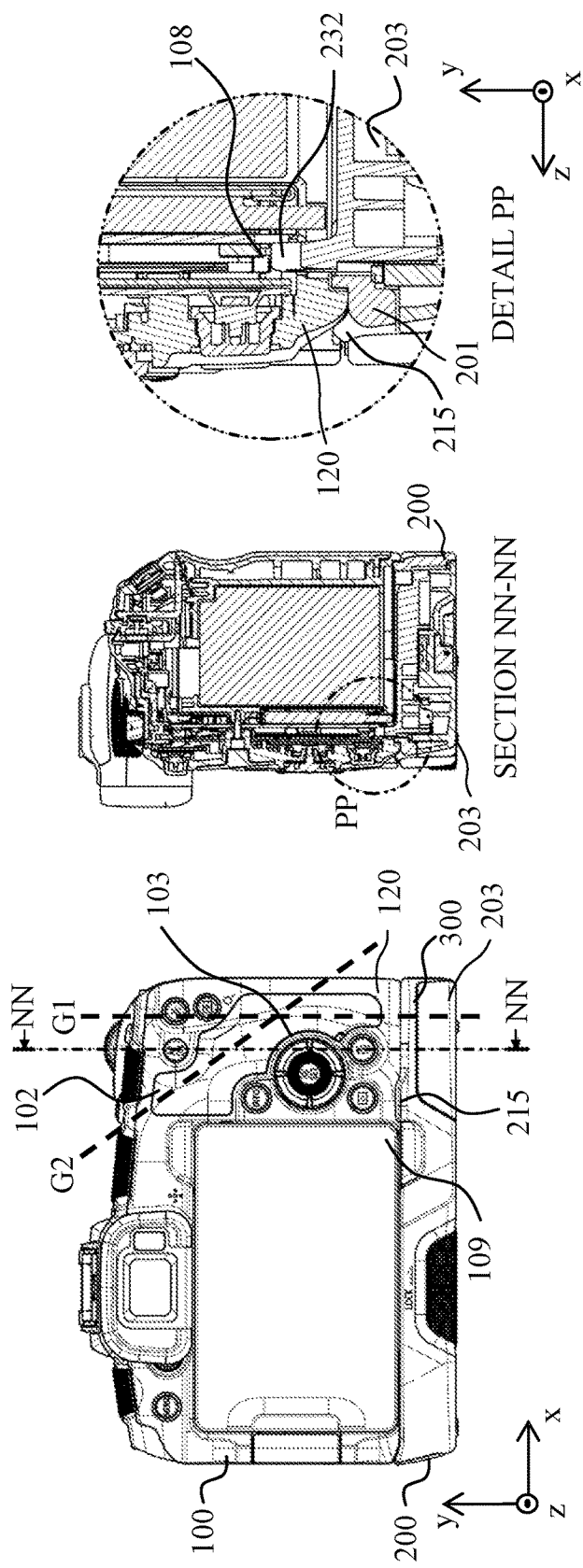
FIGS. 15A and 15B are diagrams showing a convex part provided on the extended grip according to the embodiment.

Referring now to FIGS. 15A and 15B, a description will be given of a convex part 215 provided on the extended grip 200 according to this embodiment as a countermeasure against a drop impact. FIG. 15A illustrates the rear surface of the camera 100 mounted with the extended grip 200. FIG. 15B illustrates an NN-NN section in FIG. 15A, and enlarges a PP part in the section.

As illustrated in FIGS. 15A and 15B, the convex part (protrusion) 215 is provided on the rear part of the grip housing 201 so as to protrude in the rear direction (+z direction) from the rear part. The convex part 215 faces (or contacts) the outer surface of the lower end, which is the end on the bottom surface side of the exterior member 120 on the rear side of the camera 100, near the dividing line 300 between the grip housing 201 and the grip lid member 203.

In FIG. 15A, the rear grip portion 102 of the camera 100 surrounded by a solid line is an area on which part of the hand can rest when the user holds the camera 100 by hand. Provided on both sides of the rear grip portion 102 of the camera 100 are camera operating members 103, such as a switch and a dial, for the user to give an operation instruction to the camera 100.

When the camera 100 mounted with the extended grip 200 falls in the −y direction and the extended grip 200 collides with the ground or the floor, the grip housing 201 and the lid member 203 are bent by the impact, and the extended grip 200 would be able to advance into the camera 100. In particular, when the dividing line 300 between the grip lid member 203 and the grip housing 201 is provided on the rear surface of the extended grip 200 instead of the bottom surface as in this embodiment, the grip lid member 203 would be able to advance into the camera 100. When the grip lid member 203 advance into the camera 100, the positions of the pressing part 232 provided on the grip lid member 203 and the lever portion 108a of the battery loading detection switch 108 in the z direction are reversed. Then, when the bending of the grip lid member 203 returns, the pressing part 232 may damage the lever portion 108a.

In this embodiment, when an impact or an external force that would otherwise cause the extended grip 200 to advance into the camera 100 is applied, the convex part 215 of the grip housing 201 comes into contact with the outer surface of the lower end of the exterior member 120 of the camera 100. This structure can prevent the extended grip 200 from advance into the camera 100.

As illustrated in FIG. 15A, the rear grip portion 102 of the camera 100 is set to an area along a G1 line extending in the ±y directions and a G2 line extending oblique to the ±y directions between the camera operating members 103. The convex part 215 is provided at a position that is not located on the G1 line or the G2 line and that does not overlap the camera operating member 103, that is, at a position that does not interfere with the operation of the camera operating members 103 by the user holding the camera 100.

Further, the camera 100 is provided with a van-angle monitor (movable rear monitor) 109 that can be opened and closed by rotating around an opening/closing axis extending in the ±y directions relative to the camera body. The vari-angle monitor 109 can also rotate around an axis extending in the ±x directions in the open state.

The convex part 215 is provide outside (+x direction) of the end opposite to the opening/closing shaft side of the vari-angle monitor 109 in a closed state relative to the camera body so as not to interfere with opening/closing of the vari-angle monitor 109, in other words, outside the movable range of the vari-angle monitor 109.

As described above, the extended grip 200 according to this embodiment has a structure that does not damage the camera 100 even when an impact is applied.

The present invention enables a battery to be easily inserted into and ejected from a camera by opening an accessory lid member while a camera accessory is attached to a bottom surface of the camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A camera accessory attachable to and detachable from a bottom surface of a camera, the camera accessory comprising:
   an accessory body;
   a fastening member configured to attach the accessory body to the bottom surface;
   an opening that allows a battery to be inserted into and ejected from the camera while the accessory body is attached to the bottom surface; and
   an accessory lid member attached to the accessory body and movable between an open position for opening the opening and a closed position for closing the opening,
   wherein the bottom surface of the camera has an insertion/ejection port for inserting and ejecting the battery, and
   wherein the accessory body is configured to be attached to the camera from which a camera lid member configured to open and close the insertion/ejection port is detached,
   wherein the camera includes a battery loading detector configured to detect loading of the battery into the camera, and
   wherein the accessory lid member includes a contact part that contacts the battery loading detector so as to detect the loading of the battery at the closed position.

2. The camera accessory according to claim 1, wherein the fastening member includes a tripod fastener configured to fix the accessory body to a tripod.

3. The camera accessory according to claim 1, wherein the accessory body includes a grip extender that extends from a camera grip portion provided on an object side of the camera when the accessory body is attached to the bottom surface, and
   wherein a rear part of the accessory body opposite to the grip extender has a dividing line with the accessory lid member.

4. The camera accessory according to claim 3, wherein the rear part of the accessory body includes a convex part, and
   wherein the convex part is opposite to an outer surface of an end on the bottom surface side of an exterior member of the camera.

5. The camera accessory according to claim 4, wherein the convex part is provided outside a movable range of a movable rear monitor of the camera.

6. The camera accessory according to claim 1, wherein the camera includes a battery holder movable between a holding position for holding the battery inserted into the camera and a release position for releasing holding of the battery, and
   wherein the accessory lid member includes a stopper part configured to restrict the battery holder from moving from the holding position to the release position at the closed position.

7. The camera accessory according to claim 1, wherein the opening is provided so as to enable a medium to be inserted into and ejected from the camera.

8. A camera having an insertion/ejection port in a bottom surface, which allows a battery to be inserted and ejected, the camera comprising a camera accessory detachably attached to the bottom surface,
   wherein the camera accessory includes:
   an accessory body;
   a fastening member configured to attach the accessory body to the bottom surface;

an opening that allows a battery to be inserted into and ejected from the camera while the accessory body is attached to the bottom surface; and an accessory lid member attached to the accessory body and movable between an open position for opening the opening and a closed position for closing the opening, wherein the bottom surface of the camera has an insertion/ejection port for inserting and ejecting the battery, wherein the accessory body is configured to be attached to the camera from which a camera lid member configured to open and close the insertion/ejection port is detached, wherein the camera includes a battery loading detector configured to detect loading of the battery into the camera, and wherein the accessory lid member includes a contact part that contacts the battery loading detector so as to detect the loading of the battery at the closed position.

* * * * *